Oct. 15, 1968    R. W. FRENCH    3,406,329
PARALLEL INVERTER WITH RAPID RESPONSE TIME TO
CHANGES IN PULSE DURATIONS
Original Filed Feb. 28, 1964    2 Sheets-Sheet 1
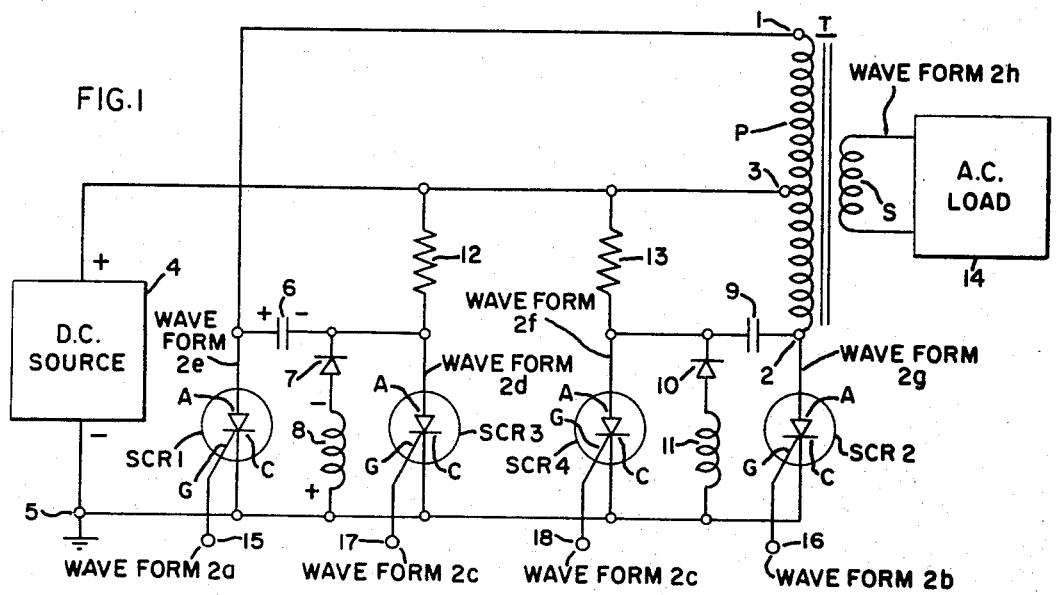
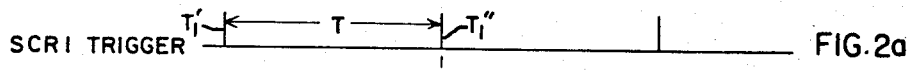
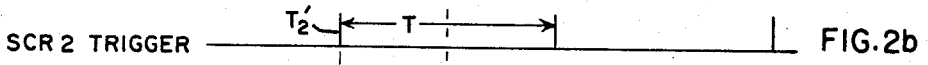
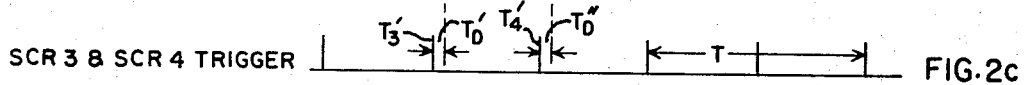
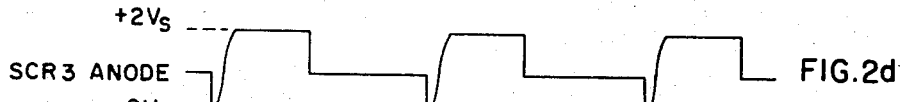
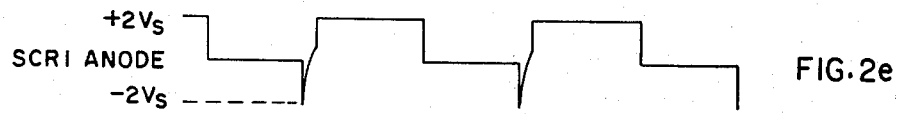
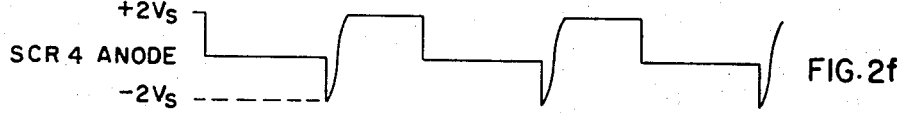
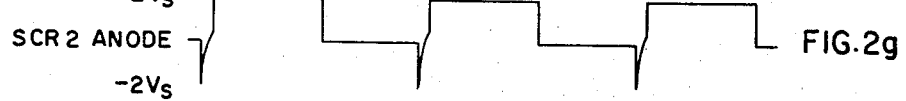
INVENTOR:
RICHARD W. FRENCH,
BY *Richard Lang*
HIS ATTORNEY.

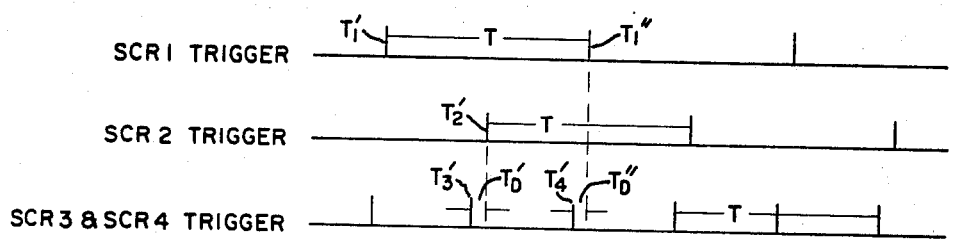
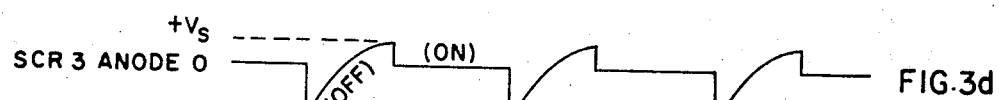
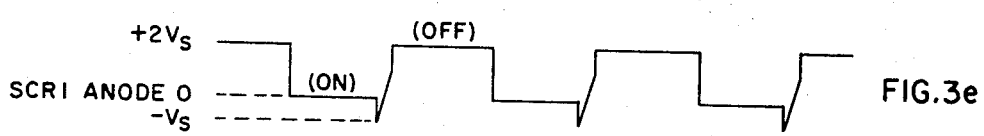
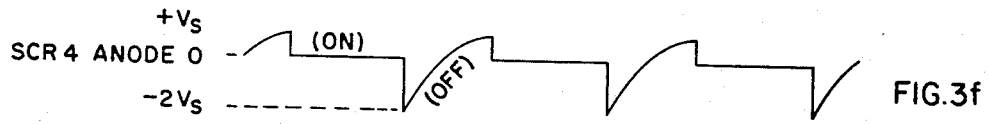
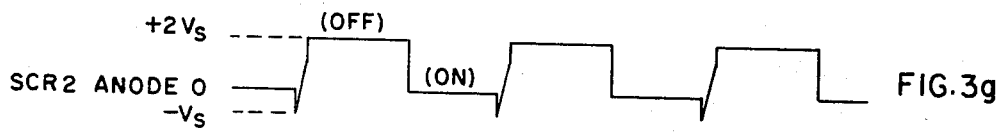
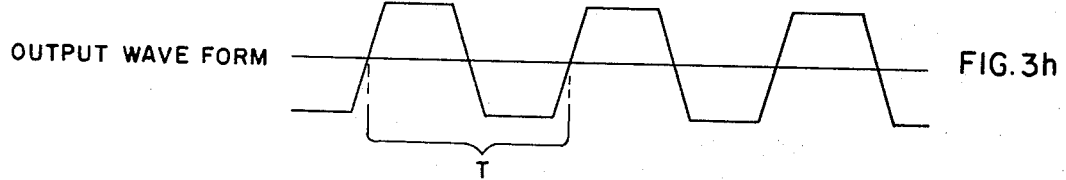

United States Patent Office 3,406,329
Patented Oct. 15, 1968

3,406,329
PARALLEL INVERTER WITH RAPID RESPONSE
TIME TO CHANGES IN PULSE DURATIONS
Richard W. French, Liverpool, N.Y., assignor to General
Electric Company, a corporation of New York
Continuation of application Ser. No. 348,002, Feb. 28,
1964. This application Dec. 19, 1966, Ser. No. 602,833
2 Claims. (Cl. 321—45)

This invention relates to parallel inverter circuits and more particularly has as an object to provide a parallel inverter circuit adapted for discontinuous or pulsed operation. The present application is a continuation of U.S. application S.N. 348,002, now abandoned.

Inverters are devices which achieve a conversion of DC energy to AC energy. In some applications they are accompanied by additional means for reconverting the AC energy back to DC energy. In principle, inverters depend upon one or more switching devices usually of the type known as "controlled rectifiers" to interrupt the flow of energy from a source of direct current energy to a load. When a pair of switching devices are employed, one can successively reverse the direction of current flow through a load and thereby supply an alternating current thereto. The parallel inverter is of this nature, and has a pair of switching devices, each controlled to operate alternately, in each of two separate paths energized "in parallel" by the DC source. Energy alternately available in the separate primary paths may be coupled as alternating current energy to the load by a transformer having a pair of primary windings feeding a single secondary load winding.

Inverters are inherently capable of proportioning or regulating the power or load current supplied to a load and may be used over a wide range of power levels. One mechanism for effecting such control is that of adjusting the duration of the conduction time of the switching devices. Assuming the constant output frequency, one can then adjust the fraction of the time for each half cycle that each switching device is conducting to bring about a control of the power current supplied to a load.

The switching devices or controlled rectifiers in such inverters may take the form of thyratrons or ignitrons or solid state devices of the type now referred to as Silicon Controlled Rectifiers (SCR's). These devices are all three-element devices having in common a high and a low state of conductivity, i.e., an "on" and an "off" state. They are usually turned on, once anode potentials have been applied, by a pulse applied to the control element. Due to the nature of these devices, turning off requires removal of the anode potentials and is not conveniently achieved by adjustment of the control potentials alone. Often to enhance rapidity of turn-off, inverse anode, or inverse anode and inverse control potentials are applied.

The thyratrons or the ignitrons operate at high power levels and are usually characterized by rather slow switching speeds. The maximum power capabilities of SCR devices are still being expanded but at the moment they are less than those of the thyratrons and ignitrons. However, because of the nature of the conduction mechanism, SCR devices do have the capability of operating at lower supply voltages and at higher output frequencies than the former classes of devices. In applications where both classes of devices can be employed, operating efficiency often favors the SCR devices which exhibit lower dissipation losses.

The conventional parallel inverters do not permit convenient discontinuous or pulsed operation. Due to the nature of the controlled rectifiers, as explained above, mere removal of the control pulses will have the effect of leaving one or the other in a state of prolonged conduction. Efficiencies in AC generation dictate that the primary circuit be of low DC impedance. The circuit usually comprises the controlled rectifier and the customary transformer primary, both of which are connected in series across the DC source. Consequently a failure of one of these rectifiers to cycle, as by removal of the control pulses, permits the current in the primary circuit whose flow is restricted primarily by reactive impedance, to surge to and remain at a maximum, limited only by the DC impedances in the primary circuit. Even were it not a question of catastrophic circuit failure, electrical efficiency dictates that power dissipation in the primary circuit be held to a minimum in the intervals when no power is being fed to a load.

The expedient of directly switching off the direct current source from the primary circuit in order to protect the primary circuit in pulsed operation has several disadvantages. It requires an additional high capacity switching means which is a major disadvantage. It also requires additional circuit complexity if one wishes to achieve rapidity in response in effecting control of the pulse envelope durations; or to retain, in starting and terminating the pulse envelope, the same accuracy in timing of the moments of turn-on and turn-off of the individual cycles achievable in the controlled rectifiers themselves.

It is therefore an object of the present invention to provide a parallel inverter system capable of pulsed or intermittent operation which does not require additional high current level switching means.

It is still another object of the present invention to provide a parallel inverter capable of pulsed operation wherein the circuit has a minimum of energy dissipation in the intervals between the delivery of energy to a load.

It is still another object of the present invention to provide a parallel inverter circuit capable of pulsed operation with a rapid response time to accommodate rapid changes in pulse envelope durations.

It is a further object of the invention to provide an improved parallel inverter system capable of pulsed operation having high accuracy in timing of both the moments of turn-on and turn-off of the individual half cycles of conduction as well as in the moments of initiation and termination of the overall pulse envelope.

Briefly stated, these and other objects of the invention are achieved in a parallel inverter circuit adapted to be connected to a source of direct current energy and employing a transformer, a pair of controlled main power rectifiers, and including a pair of novel switching circuits, each associated with one of said main power rectifiers. The transformer has a tapped first winding and one anode of one rectifier is connected to one end of the winding and the other anode of the other rectifier coupled to the other end of the winding. The negative terminal of the source of direct current energy may then be coupled to the cathodes of the main power rectifiers and the positive terminal to the tap of the transformer winding. A load may be inductively coupled to the main winding.

In accordance with one embodiment of the invention, the novel switching circuits so provided, each include an auxiliary controlled rectifier; a commutating capacitor, which is coupled between the anodes of the main rectifier and the auxiliary rectifier; and a resistance, which is coupled between the anode of the auxiliary controlled rectifier and the positive source terminal. The cathode of the auxiliary controlled rectifier is coupled to the negative source terminal. Each of the four controlled rectifiers in the overall circuit are then provided with suitable control voltages to effect proper sequential operation of the main power rectifiers. In achieving this function, the main rectifiers are turned on by suitable control potentials applied to their respective gates, and turned off by the switching circuits as a result of control voltages applied to the auxiliary rectifiers.

In a preferred version of the foregoing embodiment, a resonating inductor connected in series with a diode is coupled in shunt with the electrodes of the auxiliary controlled rectifier, with the diode being poled to pass current from ground into the inductor. The effect of this provision is to enhance the efficiency of commutation.

The subject matter of the invention is more particularly pointed out and distinctly claimed in the concluding portion of the specification. The invention, however, may best be understood by reference to the following description taken in connection with the following drawings in which:

FIGURE 1 illustrates a first embodiment of the invention.

FIGURES 2a through 2h illustrate the waveforms existing at various circuit points of the first embodiment. The waveforms are plotted as voltage vs. time with common time coordinates.

FIGURES 3a through 3h illustrate the waveforms existing at various circuit points of a second embodiment, representing a modification of the first embodiment.

In the parallel inverter circuit of the invention shown in FIGURE 1, there are provided first and second controlled main power rectifiers SCR1 and SCR2 and first and second switching circuits including, respectively, first and second resonant charging circuits and first and second controlled auxiliary or turn-off rectifiers SCR3 and SCR4. Each of the SCR's includes an anode A, a cathode C, and a gate G. The anodes A of SCR1 and SCR2 are connected respectively to opposite end terminals 1 and 2 of primary winding P of transformer T, center tap terminal 3 of the transformer primary winding P being connected to a positive terminal of DC power supply 4. The transformer T is provided with a secondary winding S coupled to a load 14. The cathode terminals C of SCR1, SCR2, SCR3, and SCR4 are connected directly to a negative terminal 5 of the DC power supply. The first resonant charging circuit comprises, a capacitor 6, a diode 7, and an inductor 8, respectively connected in series between the anode terminal A and cathode terminal C of SCR1. The second resonant charging circuit comprises, a capacitor 9, a diode 10, and an inductor 11, respectively connected in series between the anode terminal A, and the cathode terminal C of SCR2. The diodes 7 and 10 are poled for easy current flow from the inductors 8 and 11, respectively, toward the capacitors 6 and 9, respectively. The capacitor 6 interconnects the anode terminals A of SCR1 and the corresponding SCR3; similarly, capacitor 9 interconnects the anode terminals A of SCR2 and the corresponding SCR4. Current limiting resistors 12 and 13 connect the anode terminals A of SCR3 and SCR4, respectively, to the positive power supply terminal 4 to provide a holding current for maintaining conduction thereof.

The gates G of the rectifiers SCR1, SCR2, SCR3, and SCR4 are coupled respectively to the terminals 15, 16, 17, and 18. These terminals are in turn supplied with trigger pulses illustrated in FIGURES 2a, 2b, and 2c. In particular, trigger pulses applied to terminal 15 are illustrated in FIGURE 2a; trigger pulses applied to terminal 16 are illustrated in FIGURE 2b; and trigger pulses applied to terminals 17 and 18 are illustrated in FIGURE 2c. These figures will be explained below.

To provide an alternating current output, SCR1 and SCR2 are controlled in accordance with the invention to become alternately conductive for successive intervals of time. SCR1, when conductive, permits current to flow from the positive power supply terminal through primary winding P from the center tap terminal 3 to the end terminal 1 in a first interval, and SCR2, when conductive, permits current to flow from the positive power supply terminal through primary winding P from the center tap terminal 3 to the end terminal 2 in the successive interval. Thus SCR1 and SCR2, when alternately operated, each conduct successive pulses of output current alternately through the first and second halves of the primary winding P. These pulses, which are thus coupled inductively by transformer T to the secondary winding S in respectively opposite senses, produce an output waveform of alternating polarity for energization of load 14. This output waveform is as illustrated in FIGURE 2h.

The novel control means by which alternate conduction of the main power rectifiers SCR1 and SCR2 is achieved will now be explained with further resort to FIGURES 2a through 2h.

It may now be understood that at some initial time, the DC source 4 provides a positive potential coupled to point 3 of the primary of transformer T. At some subsequent instant illustrated at the moment T1' in FIGURE 2A, a turn-on trigger pulse is applied to the control gate of SCR1. This causes SCR1 to become conductive and permits a rather substantial amount of current to flow from the DC source 4 through the upper half of primary winding P in the direction from terminal 3 to terminal 1 and to ground through SCR1. The effect of the trigger upon the voltage at the anode of SCR1 is illustrated in FIGURE 2e, where it may be noted that the potential which had previously been a high positive potential has now been reduced to near zero potential, indicating the initiation of a period of high conduction.

At a moment T2' later in time than T1', a trigger pulse is applied to the gate G of SCR2 as illustrated in FIGURE 2b. Assuming the existence of a positive potential at the anode of SCR2 at the moment T2, the SCR2 becomes conductive and its anode potential falls suddenly to near zero, indicating the initiation of a period of high conduction. This is as illustrated in FIGURE 2g.

As observed earlier, the mechanism for turning on the main power rectifiers SCR1 and SCR2 is accomplished at time intervals, as explained above, by the recurrent application of the trigger pulses illustrated respectively in FIGURES 2a and 2b. The mechanism for turning off SCR1 before SCR2 becomes conductive and the mechanism for turning off SCR2 before SCR1 becomes conductive requires a consideration of the switching circuits associated with each of the main rectifiers.

The operation of these switching circuits will now be undertaken.

To achieve turn-off of a solid state device, such as an SCR, a charge depletion region must be developed at the internal rectifying junction. The depletion region can be developed inherently by the SCR if the forward biasing voltage applied between the anode and the cathode terminals thereof is removed for a sufficient length of time such as by disconnecting the SCR from the power supply circuit. Such an expedient is impractical in a parallel inverter circuit, however, and thus a second method, namely that of applying a reverse bias across the anode and cathode terminals of the SCR must be employed. In the circuit of the invention, the auxiliary controlled turn-off rectifiers SCR3 and SCR4, in conjunction with the first and second resonant charging circuits, provide the reverse biasing for achieving turn-off of SCR1 and SCR2, respectively. In addition, SCR3 and SCR4 are controlled independently of the conduction of SCR1 and SCR2 whereby both pulse-width modulation and a pulsed mode of operation are achieved in the parallel inverter circuit of the invention.

To provide operation, suitable trigger pulses of a frequency equal to the frequency of the desired output pulses are applied continuously to the gate terminals G of SCR3 and SCR4 whereby, in the absence of conduction of SCR1 and SCR2, SCR3 and SCR4 are normally maintained in a conductive state. In the conductive state, the forward potential drop of SCR3 and SCR4 essentially becomes that of a forward biased diode, whereby the capacitors 6 and 9 are subjected to a charging voltage V substantially equal to the voltage drop across the non-conducting controlled power rectifiers SCR1 and SCR2, respectively, the voltage V thus being approximately equal to the voltage of the power supply, Vs. Following the current flow for charging of capacitors 6 and 9 to the voltage V, SCR3 and SCR4 are maintained in the conducting state by the forward holding current supplied from the positive power supply terminal 4 and through the resistors 12 and 13, respectively, to the anode terminals A of SCR3 and SCR4. The value of the forward holding current is given by the equation:

$$i_h = \frac{V_s}{R} \quad (1)$$

where $i_h$ equals the forward holding current, Vs equals the value of the potential source supplied to the positive power supply terminal 4, and R equals the resistance value of either resistor 12 or resistor 13. Ideally, and for minimum power dissipation, the resistors 12 and 13 are of a magnitude which just permits the minimal value of forward holding current to flow. In practice, however, the resistors 12 and 13 will be made slightly smaller so as to supply a forward holding current slightly in excess of the requisite minimum forward holding current to assure continued conduction of SCR3 and SCR4 in spite of transients which may be introduced in the circuit and which might effect an undesirable termination of conduction of SCR3 or SCR4. While SCR3 and SCR4 are maintained conducting by the forward holding current $i_h$, the trigger pulses still are continuously applied to their gate terminals G, although they have no further effect.

To generate output power pulses, suitable trigger pulses are applied to the gate terminals G of SCR1 and SCR2 in complementary fashion, SCR1 and SCR2 respectively generating, as hereinbefore mentioned, successive alternate half cycles of the output power pulses. The turn-off operation of the circuit will be described with reference to SCR1 and its corresponding switching circuit comprising SCR3 and the first resonant charging circuit, it being recognized that SCR2 and its corresponding switching circuit comprising SCR4 and the second resonant charging circuit operate in an identical fashion.

The voltage V developed on capacitor 6 during conduction of SCR3 is of a polarity indicated in FIGURE 1. Upon triggering of SCR1 into conduction, its forward voltage drop is essentially that of a forward biased diode and thus the anode terminal A of SCR1 is essentially at ground potential. Since the charge on capacitor 6 cannot change instantaneously, and since the plate of capacitor 6 which is connected to the anode terminal A of SCR1 is referenced essentially to ground potential when SCR1 is turned on, the other plate of capacitor 6, which is connected to the anode terminal A of SCR3, drives the anode terminal A of SCR3 negative in an amount equal to the potential V. Thus, turn-on of SCR1 effects commutation by capacitor 6 to turn off SCR3.

Diode 7 is forward biased by the voltage —V at its cathode and thus is in condition for conduction. Capacitor 6 becomes a potential source, forcing current through the now conducting SCR1, inductor 8, and diode 7. Inductor 8 instantaneously develops a voltage to oppose this flow of current and thus has induced therein a potential of the polarity indicated in FIGURE 1. The value of the voltage developed across, or induced in, inductor 8 is determined by the equation:

$$E = L\frac{di}{dt} \quad (2)$$

where E equals the induced voltage, L equals the value of inductor 8, and $di/dt$ equals the rate of change of the current $i$ with time. Capacitor 6 continues to force the current $i$ through the resonant charging circuit until it is completely discharged, at which time the current $i$ is a maximum, and the voltage across both the capacitor 6 and inductor 8 is zero and that at the cathode of diode 7 is near zero. Since capacitor 6 now is discharged completely, the current begins to decrease, whereby $di/dt$, the rate of change of current, reverses its sign. The potential induced in inductor 8 instantaneously reverses its polarity, as indicated by Equation 2 above, and assumes a polarity opposite to that indicated in FIGURE 1.

During the second half of the charging cycle the inductor 8 is the potential source, forcing the current $i$ through diode 7 and charging capacitor 6 to a polarity opposite to that indicated in FIGURE 1. The current $i$ continues to be forced through the circuit by the inductor 8 until capacitor 6 is completely charged, at which time the current $i$ has been reduced to zero, and the potential across both capacitor 6 and inductor 8 reach their maximum values and are of a polarity to cause the potential at the cathode of diode 7 to become +V, reverse biasing diode 7 to its non-conducting state. In an ordinary resonant circuit, capacitor 6 would become the voltage source and begin to force current through the resonant charging circuit in the opposite direction. However, diode 7, now being reverse biased, prevents the reversal of current flow and the voltage condition stabilizes. Capacitor 6 maintains, in substantially undiminished amount, the potential V for the remainder of the conducting interval of SCR1. To terminate conduction of SCR1, an appropriate trigger pulse is applied to the gate terminal G or SCR3 to render it conductive. Due to the charge reversal on capacitor 6 effected by the resonant charging circuit, capacitor 6 is charged nearly to the voltage V of the requisite polarity to perform the commutation function for turning off SCR1.

As a part of the commutation function the capacitor 6 also must supply sufficient electrical energy to provide for the conduction of a reverse current through SCR1 and SCR3 to perform the turn-off function. The reverse current aids in developing the depletion region and is proportional to the forward anode current at the time of turn-off. Since the forward current, $i_h$, in SCR3 at time of turn-off is adjusted to be just slightly greater than the minimum required holding current, the reverse current is quite small and effects only a slight reduction in the total charge of potential V originally developed on capacitor 6. The energy required for turning off SCR1 is a great deal larger, however, due to the fact that turn-off of SCR1 may be required to be performed at a time at which SCR1 is conducting maximum load current. The energy stored by the capacitor is calculated in accordance with the equation:

$$U = \tfrac{1}{2}CV^2 \quad (3)$$

where U equals the amount of electrical energy, C equals the value of the capacitor 6, and V equals the voltage of the potential charge on the capacitor 6. Since the energy required to be supplied by capacitor 6 is determined by the maximum turn-off function to be performed, the value of the capacitor 6 may be determined from Equation 3.

The waveforms for an ideal resonant charging circuit are essentially sinusoidal; however, due to losses, the current $i$ is partially dissipated and the capacitor 6 is charged to a value less than the original potential V. The actual potential attained at the cathode of diode 7 may be determined, assuming an original charge of —V on capacitor 6, and that the flow of current $i$ recharges capacitor 6 to a value $kV$ of the opposite polarity at time $t = T_R$. The factor $k$ is a function of the Q of the resonant circuit and increases as Q increases. By appropriate choice of circuit components in the resonant circuit, a value of $k$ of 0.8 to 0.9 may be obtained, $k$ ideally approaching a limit of 1.0. Some of the charge developed on capacitor 6 also will be removed in supplying the reverse current through SCR3 when it is turned off by the conduction of SCR1, as previously noted. Thus, the value of capacitor 6 should be determined by including the factor $k$ in Equation 3.

The time $T_R$, is the time in which the resonant circuit operates to achieve a full polarity reversal, and may be calculated from the equation:

$$T_R = \pi\sqrt{LC} \quad (4)$$

where L and C are the values of the inductor 8 and the capacitor 6, respectively. $T_R$ is thus one-half of the natural period of resonance. Inasmuch as the value of C is determined by the energy required for achieving turn-off of SCR1, primarily, and in accordance with Equation 3, it will be appreciated that the value of the inductance L may be varied for achieving a resonant charging time, $T_R$, of a desired value.

During the first conduction period of SCR1 described above, autotransformer action will cause a voltage of $2Vs$ to be impressed upon the anode of SCR2 and this potential will cause capacitor 9 to be charged to a higher potential (ideally $2Vs$) than the potential $Vs$ which it acquired during the quiescent period preceding the application of the first trigger to the gate of SCR1. When SCR1 is turned off following this first conduction period, the associated resonant charging circuit will be inactive as the inductor 8 and the diode 7 are shunted by the conducting SCR3. The capacitor 6 will now be supplied current from the power via the transformer primary half from terminals 3 to terminal 1 and through SCR3 to ground. As the capacitor is charged its voltage polarity will be reversed and become that shown in FIGURE 1. If this charging action were allowed to continue the capacitor 6 would eventually be charged to the supply voltage $Vs$ and the circuit would be in its original condition (before the application of the first trigger to the gate of SCR1). However, SCR2 will be triggered to the on state at the end of the time interval $T_D{}^1$ indicated in FIGURE 2C following turn-off of SCR1 and by autotransformer action the potential on transformer terminal 1 will increase to $2Vs$. Capacitor 6 will now charge to this increased potential of $2Vs$. Following the initial half-cycle of operation the potential on the capacitors 6 and 9 will attain a value of $+2Vs$ and $-2Vs$ on alternate half-cycles as indicated by the waveforms of FIGURE 2, neglecting losses in the resonant charging circuit components.

It will be appreciated that the action of the resonant charging circuit comprising capacitor 9, diode 10, and inductor 11, for effecting reversal of the charge polarity on capacitor 9, will be identical to that of the first resonant charging circuit but coordinated with the operation of the corresponding SCR2 and SCR4 during generation of the succeeding alternate half-cycle of the output power pulse.

The timing chart of FIGURES 2a to 2h, and in particular FIGURES 2d through 2g, illustrate the manner in which the corresponding rectifiers SCR1 and SCR3 and the corresponding rectifiers SCR2 and SCR4 are operated in the process of producing a series of output pulses. One complete output pulse is generated within each of the successive time periods T as indicated by the FIGURE 2h. T is the period of one cycle of the output pulses, and is related to the frequency $f$ thereof by the equation:

$$T = \frac{1}{f} \quad (5)$$

Assuming that SCR3 and SCR4 have been appropriately triggered for charging their respective capacitors 6 and 9, and further assuming that each complete cycle of an output pulse commences with the initiation of conduction of SCR1, the first half-cycle of an output pulse is generated by the application of trigger pulse $T_1'$ as shown at FIGURE 2a to the gate terminal G of SCR1. SCR1 thereby conducts the power current from the positive terminal of power supply 4 and through the primary winding P from the center tap terminal 3 to the end terminal 1. The length of the conductive interval of SCR1 is determined by, and essentially equal to the time interval following $T1'$ at which trigger pulse $T3'$ as shown at FIGURE 2c is applied to the gate terminal G of SCR3 to initiate its conduction as shown at FIGURE 2d thereby terminating conduction of SCR1. The anode voltage of SCR1 is shown at FIGURE 2e.

For a given frequency of output power pulses, the time interval is controlled by two limiting factors. The first factor is that the time interval of conduction of SCR1 must be in excess of the time, $T_R$, which, as represented by Equation 3, is a function of the resonant circuit parameters, to permit the charge polarity reversal on the commutating capacitor 6 to be effected. $T_R$ may generally be made small relative to the period T of the output pulses and hence is usually a relatively inconsequential limiting factor. The second factor relates to the autotransformer action of primary winding P due to the parallel connection and alternate conduction of SCR1 and SCR2. When SCR2 is triggered into conduction by trigger pulse $T2'$, as shown at FIGURE 2b, current is conducted from the positive terminal of the potential source through the positive terminal of power supply 4 and the primary winding P for generating the second half-cycle of the output pulse. The anode voltage of SCR2 is shown at 2g. The autotransformer action of primary winding P causes a rapid rise of voltage at the anode terminal A of SCR1. A finite amount of time is required, however, to develop the depletion region at the rectifying junction of SCR1 to achieve its complete turn-off. If the charge depletion region is not established, the positive rise of voltage at the anode due to the autotransformer action will cause conduction of SCR1 even in the absence of a gate trigger. Trigger pulse $T3'$, therefore, must occur sufficiently in advance of trigger pulse $T2'$ such that the requisite charge depletion region for complete turn-off of SCR1 is achieved prior to this rapid rise in anode voltage upon conduction of SCR2. This interval is $T_D'$, as illustrated in FIGURE 2c. The minimum time interval $T_D''$ following $T_2'$ at which $T_4'$ occurs likewise is controlled by the period $T_R$ of the second resonant circuit, which is equal to the period $T_R$ of the first resonant circuit. Thus, the minimum time intervals $T_D'$ and $T_D''$, shown at FIGURE 2c are equal.

Further, to achieve balanced output power pulses as shown at 2h, the time interval between $T_2'$ and $T_4'$ must be identical to the time interval between $T_1'$ and $T_3'$ so that SCR1 and SCR2 conduct for equal lengths of time. Thus, $T_3'$ and $T_4'$ are complementary to one another, occurring at identical time intervals following trigger pulses $T_1'$ and $T_2'$, respectively, and thus at identical time intervals following initiation of their respective half-cycles of the output power pulses.

The capability of providing pulsed operation in the parallel inverter circuit of the invention is a direct result of the independent operation of the switching circuits relative to either of the controlled power rectifiers SCR1 and SCR2. As discussed above, the trigger pulses applied to the various SCR's are necessarily synchronized to provide balanced output pulses. However, the trigger pulses $T_3$ and $T_4$ are applied continuously to SCR3 and SCR4, respectively, thereby maintaining their respective switching circuits in a condition to perform their turn-off functions at all times independently both of each other and of the conductive state of either of the main controlled power rectifiers. Further during the turn-on of each main power rectifier, the corresponding switching circuit may be energized at a desired earlier time during the conduction interval to effect an earlier turn-off thereof, to control the output pulse width for such purposes as regulating the output power. In the usual event, this would correspond to an advancing in time of all the triggers illustrated in FIGURE 2c applied to the control rectifiers SCR3 and SCR4. The minimum duration pulse width is then limited by the commutation rate of the resonant charging circuit as explained earlier and by the time actually required to turn off the main rectifiers. This adjustment of conduction intervals is the preferred method of achieving a regulation of the output power of the converter.

The circuit is instantly responsive to applied control pulses once the DC source is energized, placing the circuit in stand-by condition. Initiation and termination of the output pulse envelope is effected by merely starting and stopping the pulse trains applied to the main power rectifiers. In stand-by condition, as explained earlier, each main power rectifier is turned on substantially simultaneously with the application of its respective control pulse. Also, during stand-by condition, the control circuit, which is required for appropriate cyclical turn-off of the main rectifiers, is energized. Thus the coverter in stand-by condition is subject to complete instantaneous control, and can so remain for any desired time interval.

The power dissipation of the converter during stand-by condition is quite modest. The main rectifiers (SCR1 and SCR2) dissipate only a small amount of energy in the form of leakage current, since they are in an off condition. The controlling rectifiers (SCR3 and SCR4) and their associated circuits dissipate only modest amounts of energy since the circuit can be adjusted to provide the minimum current required to keep these rectifiers in the high conduction state. The energy dissipation required for this function is also qiute small.

In a typical application of pulsed operation, the frequency of operation of the circuit may be on the order of a kilocycle with pulse envelopes of any duration. Since the commencement and termination of the pulse envelope is controlled by the pulses used to initiate each individual pulse, it may be seen that one may achieve a high accuracy in determining the pulse envelope initiation, termination, and duration comparable to a fraction of an individual pulse.

Due to the connection of the cathodes C of the rectifiers SCR1, SCR2, SCR3, and SCR4 directly to the negative power supply terminal 5, the trigger pulses may be applied directly to the gate terminals G of these rectifiers by direct connection from any suitable triggering source without the need of employing coupling transformers as required in many prior art circuits. Further, since the trigger pulses $T_3$ and $T_4$ applied to SCR3 are required to be complementary, and since SCR3 and SCR4 are to be continuously triggered, a single source of trigger pulses operating at a frequency twice that of the desired frequency of the output power pulses may be applied in common to the gate terminals G of both SCR3 and SCR4.

In the circuit of FIGURE 1, a ballast inductor may also be provided having a first winding connected in series between the center tap 3 of the primary winding P and the positive terminal of power supply 4, and a second winding also connected to the positive terminal of the DC source but having its other terminal connected to the cathode of a diode. The anode of the diode would be connected to ground. (The resistors 12 and 13 would be retained coupled to the positive terminal of power supply 4.)

The ballast inductor 19 and associated diode may be used to reduce current surges in the primary circuit. They are particularly useful when the load 14 is a tuned load or capacitive but may not be necessary when the load is inductive or resistive. The inductance of the first winding of the inductor is made sufficiently large to stabilize the current derived from the source throughout an individual pulse period. The second winding on the ballast inductor and the diode reduces the voltage excursions which would otherwise occur in the primary circuit as a result of the inductance of the first winding. The second winding of the ballast and the diode divert the current which would undesirably circulate in the primary circuit of the transformer as the inductive field of the ballast collapses, and returns the current to the power supply.

This measure provides a substantial improvement in circuit efficiency as well as a reduction in voltage transients on the SCR devices. The addition of the second winding limits the voltage at the center tap 3 of the primary winding $P_1$ in accordance with the equation:

$$V = Vs\left(1 + \frac{N_1}{N_2}\right) \quad (6)$$

where V is the voltage at the center tap 3, Vs is the voltage of the power supply 4 and $N_1$ and $N_2$ are the number of turns on the first and second windings, respectively. A practical ratio of $N_2$ to $N_1$ may be 4 to 1.

A parallel inverter circuit similar to that illustrated in FIGURE 1 and having a power output on the order of 1000 watts may have the following typical circuit values:

| | |
|---|---|
| Capacitors 6 and 9 | 1,2 μf., 600 v. |
| Ballast inductor (when used) | 1 mh. @ 15 a. DC $N_2/N_1=4$. |
| Inductors 8 and 11 | 175 μh. |
| Diodes 7 and 10 | 1N250. |
| SCR1, SCR2 | 2N686. |
| SCR3, SCR4 | 2N1775A. |
| Resistors 12 and 13 | 16,000Ω. |
| Load Resistors | 185Ω. |
| DC source | 80 v. |

While the output waveforms have been shown to be slightly trapezoidal rectangular pulses of alternating polarity, one can in fact produce a variety of output waveforms which vary from sinusoidal to nearly perfect rectangular pulses. Where it is desirable to produce a sinusoidal waveform, this can usually be achieved by tuning the load to make it essentially resonant at the pulse frequency.

In addition to producing alternating waveforms, one may rectify the output pulses to produce a DC output voltage.

The parallel inverter circuits of the invention are extremely useful in that they provide both a pulsed mode of operation and means for regulation of the output power. In operation, the circuits are very efficient, since only a minimal amount of power is dissipated in the switching control circuits. Further, the independent control of the switching control circuits and the main power rectifiers by external gating signal means provides greater reliability and more versatility in regulation than can be achieved with prior art circuits. These advantages are achieved in configurations which are simple in construction and economical of components.

The parallel inverter embodiments so far described, may in certain applications be further modified. Instead of utilizing a separate secondary for load energization, one may couple the load directly to taps arranged on the primary winding in the manner of an autotransformer. For symmetry in output waveform, the taps should be arranged at equal distances from the center of the primary winding. In order to eliminate a fixed DC potential in the load, one would ordinarily earth the positive terminal of the DC source and operate its negative terminal below ground potential.

One may eliminate the resonating inductor and associated diode in both branches of the configuration of FIGURE 1. This has the effect of reducing the commutating efficiency of the circuit. When the circuit is operated at a slow rate, the commutating loss may be a small fraction of total energy delivered and thus quite tolerable. However, as the commutating rate increases, the energy loss increases proportionately, since the loss is essentially constant for each cycle of operation.

The commutating action takes place in this modified circuit in the following fashion. (Reference, for convenience will be made to FIGURE 1, where now the inductors 8 and 11 and associated diodes 7 and 10 are removed.) The waveforms which appear at various points in the circuit are shown in FIGURES 3a–3h. Let us further assume an initial operating condition in which the SCR3 is on, SCR1 is off, and the capacitor 6 has been charged to 2Vs. Due to autotransformer action of the full primary winding, the voltage across the capacitor will be double Vs and will have the polarity shown in FIGURE 1.

Let one now trigger SCR1 on. The charge corresponding to 2Vs is usefully used to extinguish the auxiliary rectifier SCR3, which accounts for a very small portion of the total capacitor energy, and the balance is essentially dissipated in resistor 12. Current continues to flow in the same direction through capacitor 6 and resistor 12 until the capacitor has been charged to the voltage Vs in the opposite polarity to that shown in FIGURE 1. The waveform at the anode of SCR3 is shown in FIGURE 3d.

Essentially all of the initial energy of the capacitor [½C(2Vs²)=2CVs²] is dissipated in discharging the capacitor through resistor 12, and during the charging cycle as much energy is dissipated in the serial resistor 12 as is placed in the capacitor 6 [½C Vs²].

To complete this half-cycle of operation, SCR3 is now fired, while the capacitor 6 is charged to the voltage Vs in a polarity opposite to that shown in FIGURE 1. A substantial fraction of the energy stored in the capacitor may be required to extinguish the main SCR1, the fraction being dependent on its level of conduction. The remainder of the energy is then used to enhance current flow through the primary winding of transformer T, thus contributing to the total output power. Current continues in the same sense through the capacitor 6 and SCR3 to ground until capacitor 6 is charge to 2Vs in a polarity shown in FIGURE 1. This charging path has relatively little loss.

The charging cycle is now complete with approximately [3CVs²] units of energy being expended to charge the commutating capacitor and only approximately [½CVs] units of energy being usefully used to turn off the rectifiers. Thus it follows that more than ⅚ of the energy accumulated in the capacitor during the commutating cycle is unused.

Although the invention has been described with respect to certain specific embodiments, it will be appreciated that various modifications and changes may be made by those skilled in the art without departing from the spirit and scope of the invention.

What is claimed as new and desired to be secured by Letters Patent in the United States is:

1. In a parallel inverter for conversion of DC to AC electrical energy, the combination comprising:
   a transformer having a tapped winding;
   a first and a second controlled rectifier each having anode, cathode and control electrodes, the respective anodes of said rectifiers being coupled to opposite ends of said winding;
   input terminals for connection to a DC source being coupled respectively to said tap and to the cathodes of said first and second controlled rectifiers;
   means for coupling to said respective control electrodes of said first and second controlled rectifiers firing potentials at desired moments in time;
   a first switching circuit for extinguishing said first controlled rectifier comprising a first auxiliary controlled rectifier having an anode, cathode and control electrodes, a first commutating capacitor coupled between the anodes of said first rectifier and said auxiliary rectifier, and means interconnecting the cathodes of said two last recited rectifiers;
   a second switching circuit for extinguishing said second controlled rectifier comprising a second auxiliary controlled rectifier having an anode, cathode and control electrodes, a second commutating capacitor coupled between the anodes of said second rectifier and said second auxiliary rectifier, and means interconnecting the cathodes of said two last recited rectifiers;
   means for coupling to said respective control electrodes of said first and second auxiliary controlled rectifiers firing potentials at desired moments in time; and
   energizing means including a resistance coupled between said tap connected input terminal and the anode of each auxiliary rectifier to provide current sufficient to sustain conduction therein.

2. The combination set forth in claim 1 wherein each of said switching circuits additionally comprises energizing means including a serially connected resonating inductor and diode connected in shunt with the anode and cathode of said respective auxiliary rectifier, with the diode poled to permit current flow toward said auxiliary rectifier anode.

References Cited

UNITED STATES PATENTS

| | | | |
|---|---|---|---|
| 3,075,136 | 1/1963 | Jones | 321—45 |
| 3,181,053 | 4/1965 | Amato | 321—45 |
| 3,213,352 | 10/1965 | Faith | 321—45 |
| 3,263,153 | 7/1966 | Lawn | 321—45 |
| 3,349,314 | 10/1967 | Giannamore | 321—43 |

LEE T. HIX, *Primary Examiner.*

G. GOLDBERG, *Assistant Examiner.*